(No Model.) 2 Sheets—Sheet 2.

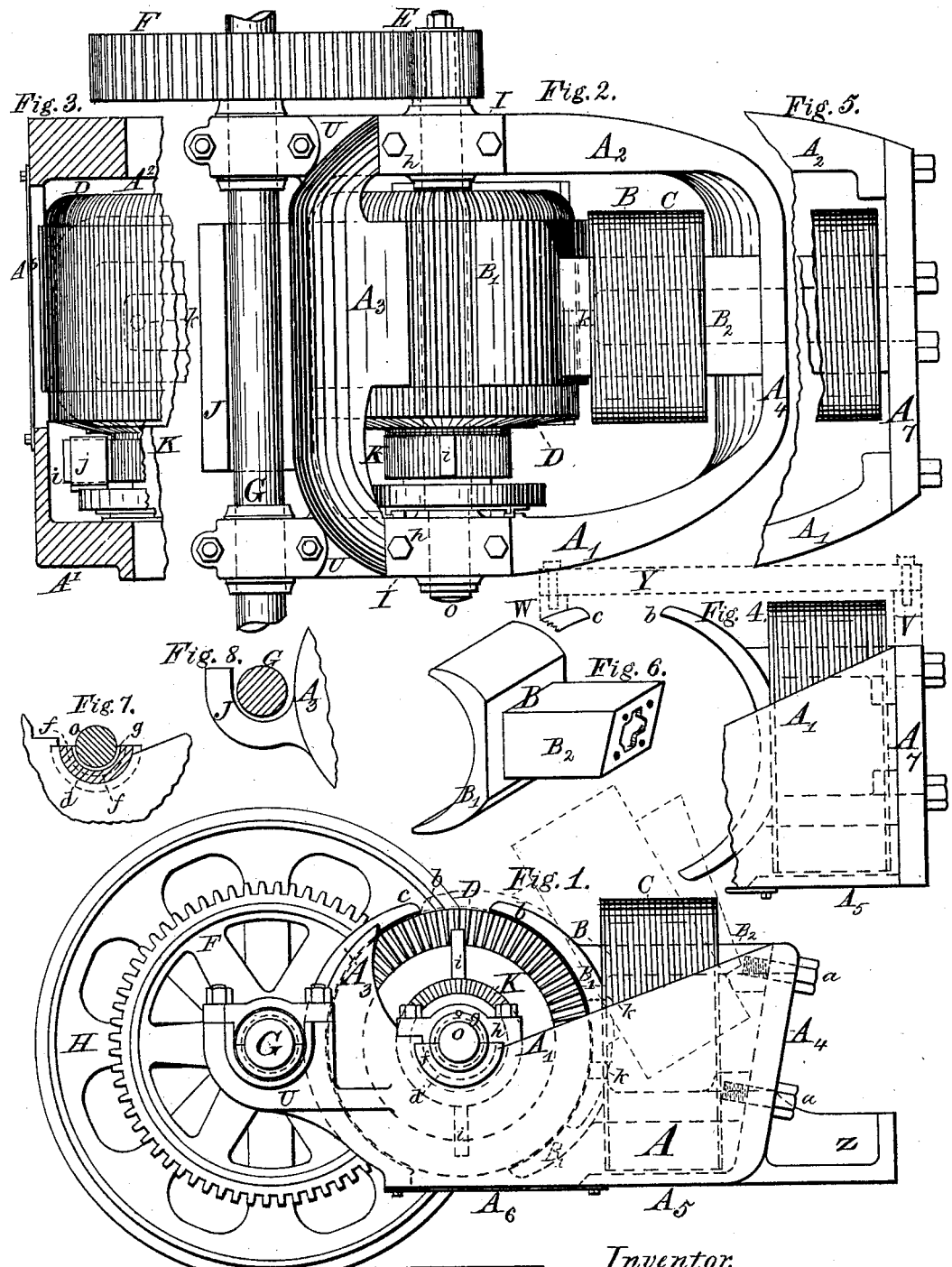

C. E. EMERY.
ELECTRIC MOTOR FOR STREET CARS.

No. 592,965. Patented Nov. 2, 1897.

Witnesses,
Livingston Emmy
J. A. Ruoff

Inventor,
Chas. E. Emery

UNITED STATES PATENT OFFICE.

CHARLES E. EMERY, OF BROOKLYN, NEW YORK.

ELECTRIC MOTOR FOR STREET-CARS.

SPECIFICATION forming part of Letters Patent No. 592,965, dated November 2, 1897.

Application filed October 15, 1892. Serial No. 448,936. (No model.)

*To all whom it may concern:*

Be it known that I, CHARLES E. EMERY, of the city of Brooklyn, county of Kings, and State of New York, (office New York city,) have invented a new and Improved Electric Motor for Street-Cars; and I do hereby declare that the following is a full, clear, and exact description of the same, reference being had to the accompanying drawings, making part of this specification, in which—

Figure 10:
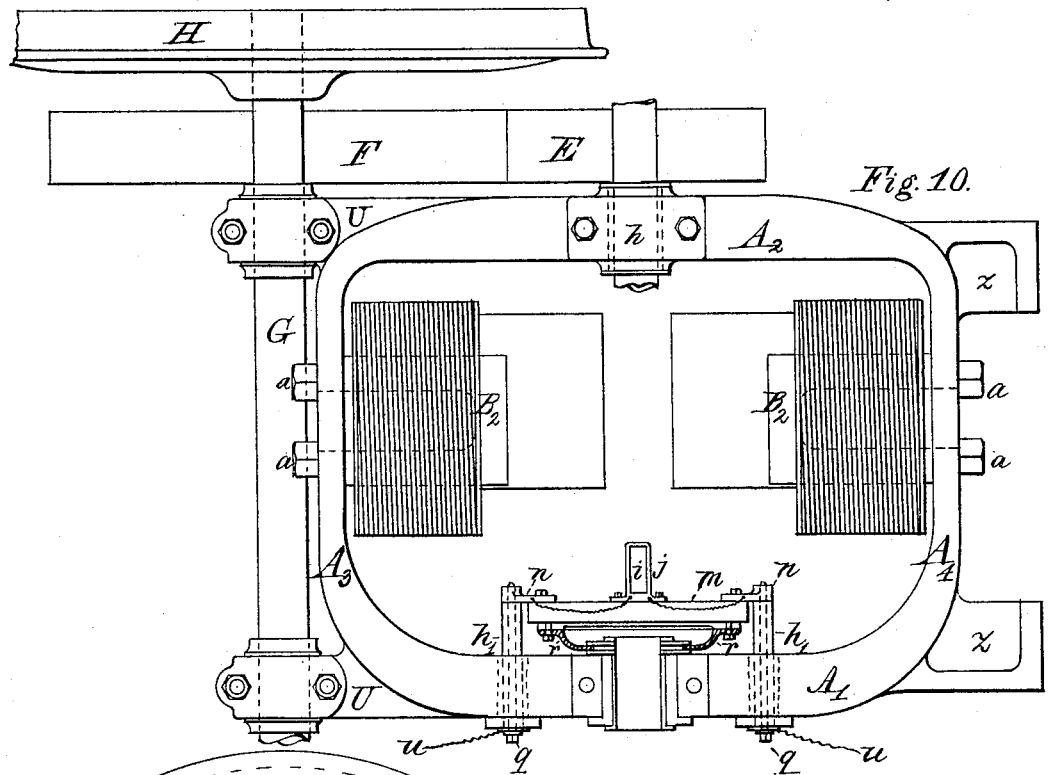
Figure 9:
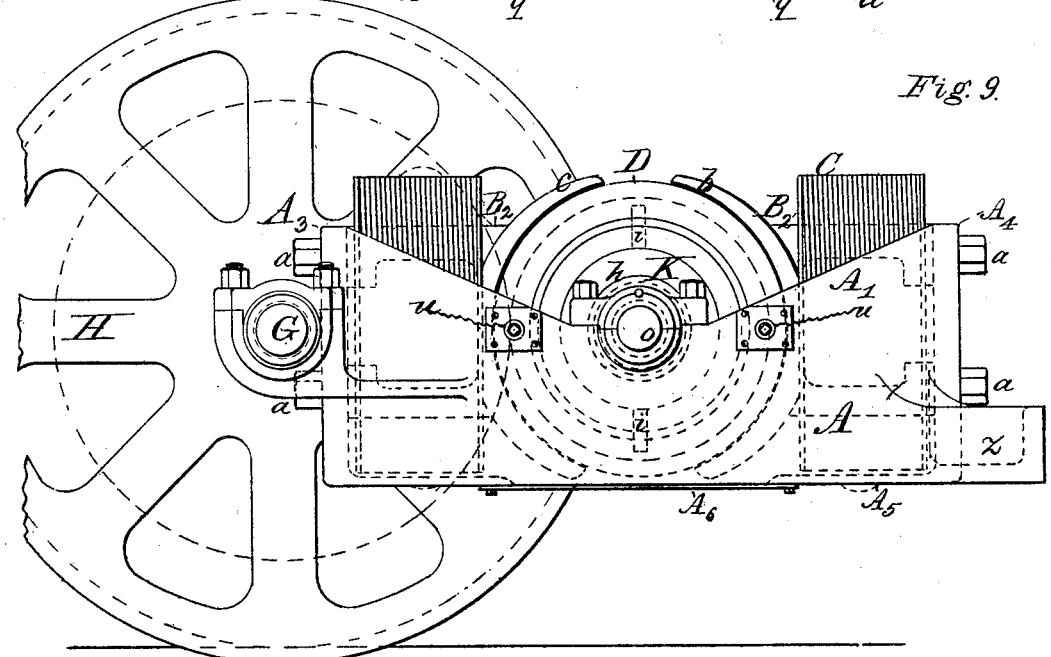

Figure 1 represents a side elevation of the motor in place connected to the axle of an electric car. Fig. 2 represents a plan view of the same. Fig. 3 represents a vertical cross-section of the frame at the armature-shaft and shows also an external view of a portion of the armature and commutator below the level of the shaft. Fig. 4 is a partial elevation showing a modification of the construction of one end of the motor. Fig. 5 is a plan view of the same. Fig. 6 represents a perspective view of the removable pole and pole-piece. Fig. 7 is a detached view, partly in section, of the arrangement used at the bearings of the armature-shaft, this view referring particularly to the bearing on the side opposite the commutator when looking from within the frame outward. Fig. 8 represents a detached view of a neutralizing magnetic hook and its relation to the car-axle. Fig. 9 represents a side elevation of a motor with two field-coils, both ends resembling the form shown at the right-hand end of Figs. 1, 2, 4, and 5. Fig. 10 is a plan view of the same, partly in section, with armature, commutator, and shaft removed.

In the design of an electric motor for street-cars to be placed under the car it is particularly desirable that at least the lower half of the motor be protected from collections of snow or water on the tracks, and it is more desirable to accomplish this in the construction of the motor itself than by the addition of a pan external thereto.

The invention consists, in general terms, of a tub or cradle shaped frame, of which the sides support the armature-shaft and form the yoke, and of which the ends form the poles directly or by the internal attachment of pole-pieces.

The invention further consists in details of construction designed to carry into effect the general feature of the invention.

In the particular application of the invention shown in the drawings the cradle-shaped frame is designated in general terms A. The sides are marked $A'$ $A^2$, the ends $A^3$ $A^4$, and different parts of the bottom $A^5$ $A^6$. One of the ends, $A^3$, is carried quite high and made concave on the inside to form one of the pole-pieces of a bipolar motor, and the depressed sides $A'$ $A^2$ of the frame receive the bearings of the armature.

The other pole-piece, with attached parts, is in general called a "pole" and is designated B and made removable. The pole-piece proper of pole B is designated $B'$. To the rear of the same is attached a projecting magnet-core $B^2$, frequently called herein the "magnet" $B^2$, over which is placed a bobbin C, containing the field exciting-coil. The rear end of the magnet $B^2$ is bolted to a face inside the end $A^4$ of the cradle-shaped frame. The result is that the field exciting-coil C generates lines of force in pole B, which pass through the magnet $B^2$ and the pole-piece $B'$, across the armature D to the pole-piece $A^3$ at the other end of the frame, and then return through the sides $A'$ $A^2$ of the frame as yokes and the end $A^4$ of frame to the rear of the magnet $B^2$.

Preferably the space beneath the magnet-coil is connected by a bottom plate $A^5$, formed integrally with the sides and ends of the cradle-shaped frame, and this integrally-formed bottom may be continued entirely across to the integral pole-piece $A^3$ by carrying the same down below the armature so far that there will be little magnetic leakage between the lower edge of the inserted pole-piece $B'$ and the integral bottom. In practice, however, it is desirable that the motor should be elevated as much above the rail as possible. So it is preferred to make an opening through the bottom of the cradle-shaped frame opposite the armature D and inserted pole-piece $B'$ and then to make the bottom water-tight by covering the opening with a properly-secured plate $A^6$, of copper or other non-magnetic material. In this way also the tendency to draw the armature downward by the presence of the magnetic material below the armature is prevented. The opposite result—viz., a tendency to lift the armature—is secured by making the gap between the ends of the pole-pieces $A^3$ and $B'$ larger at the bottom than at the top.

In Figs 1 and 2 of the drawings the motor is shown of what is called the "single-reduction" type, in which a pinion E is mounted on one end of the armature-shaft and engages with a spur-wheel F on the car-axle G, which is supported by the end $A^3$ of the cradle-shaped frame through bearings U U, attached to the latter. In Fig. 1, H is one of the car-wheels shown beyond the motor. In one method of constructing this motor (shown in Figs. 1 and 2) the end $A^4$ of the cradle-shaped frame is preferably constructed to incline outward from a perpendicular. The interior inclined surface of the end is faced and the rear end of the magnet $B^2$, fitted thereto and secured by bolts $a\ a$, Fig. 1. The inclination is made at such angle that when the armature D and the removable pole B with exciting-coil C are in place by loosening the bolts $a\ a$ at the rear the removable pole B may first be revolved around the armature to the position of the dotted lines, where the tops $b\ c$ of opposite poles touch each other, and then lifted out by swinging the lower end back a little, so that the lower edge of the pole-piece clears the armature. The pole B complete with exciting-coil may be replaced as a unit by reversing the operation.

When for any reason it is desired to make the outer end of the removable pole B with a vertical face, one end of the cradle-shaped frame is preferably left open, as shown in Figs. 4 and 5, and faced to receive a plate $A^7$, which connects the two sides $A'\ A^2$ and the bottom $A^5$ of the frame, and to which, near the center, is secured the rear end of the magnet $B^2$, as shown clearly in the figures referred to. The abutting-faces on the plate $A^7$ and on the sides $A'\ A^2$ and bottom $A^5$ of the frame and those on the rear end of the magnet $B^2$ should be scraped to a good fit, so as to be water-tight and secure good magnetic contact.

It is to be understood that other joints may be made in the cradle-shaped frame at any point desired for convenience in adapting the system, so long as such of the same as are below the axle are made water-tight.

As shown in Figs. 9 and 10, a field-coil may be provided at each end of the motor by practically duplicating the arrangement at the right in Figs. 1 and 2 or 4 and 5. With this arrangement the end $A^3$ of the frame and the ends of the magnet-cores $B^2$ would in general be made vertical, and the magnet-cores can be secured by attaching the same to removable plates, like $A^7$, Figs. 4 and 5; but preferably the ends would be integral with the sides of the frame and provided with an internal facing-piece to which the magnet-cores $B^2$ would be secured by bolts $a$, as shown in Figs. 9 and 10, in which case with such bolts removed the armature and both pole-pieces, with magnet cores and coils, would be removed or replaced together as a unit after removing the caps $h$ of the armature-bearings.

A motor of this type with double exciting-coils, as shown in Figs. 9 and 10, may be connected by gearing E and F (shown in dotted lines) with a car-axle G, running through bearing-brackets U U on one end of the motor and provided with car-wheels H, (only one being shown,) when the width of the pole-pieces, compared with that of the magnet-cores, the diameter of the armature, and the ratio of gearing, is such as to permit it. In this motor, as in the other, brackets $z$ are provided for spring connections with the frame of the truck, as is customary.

When an integral end of the frame is made concave to form a pole-piece, as shown by $A^3$ in Fig. 1, the bearings for the armature-shaft $o$ (designated in general I I) are preferably made as follows: A cylindrical concavity $d$ is first bored in the frame on each side of sufficient diameter to receive a boring-bar of proper size to carry cutters to bore out the pole-pieces in place. This concavity is filled by a half-bushing $f$, formed with flanges which, so to speak, bushes down the size to that of the bearing-brasses $g$, which carry the armature-journals. The upper brasses of armature-shaft fit within a cap $h$, which bears on the edges of the half-bushing $f$, and is held down with bolts secured to the frame outside such half-bushing, so that when the cap $h$ is screwed down the half-bushing is secured in place as if it were part of the frame. When, however, it is desired to put in or remove the armature with its attached shaft, the pole B, with the exciting-coil C, is first removed as a unit. The caps $h$ and upper brasses $g$ are also removed and the bushing and lower brasses revolved until the shaft $o$ is free to move angularly substantially along the line of the upper edge of the right-hand side of the frame sufficiently that the armature will clear the upper edge of the pole-piece $A^3$ at $c$.

The magnet $B^2$ is preferably made hollow longitudinally and a corresponding opening cut in the end $A^4$ or end plate $A^7$ of the cradle-frame. The principal object of the hollow is to secure ventilation, so that the exciting-coil C may be unusually thick and short to save weight, &c. To aid in cooling the magnet, one or more openings $k$ from the hollow therein are carried through the pole-piece B', so that air will be blown therein by the motion of the armature. The openings also aid in balancing any side thrust, due to the fact that the pole-piece nearest the coil C may be more strongly magnetized. The lower openings shown may be omitted when there is danger from water.

In the construction shown, with the car-axle G so near one of the pole-pieces $A^3$, attraction will naturally take place and cause considerable friction in the bearings. To obviate this, a hook J, integral with or attached to the pole-piece, is carried underneath the axle, with its outer edge extended, preferably, as high or nearly as high as the shaft, when the attraction of the metal on the hook at one side will nearly balance that of the pole on the other, and the attraction between the lower portion of the hook and the shaft will, by tending to lift the motor, relieve to that extent the load on the bearings. The space between the shaft and the inner surface of the hook and that on the bottom may be made less than on the side toward the pole-piece, so the attraction for the hook will be greater than for the pole-piece and the hook need not be made the full width of the pole-piece. This device may be applied to relieve the strain on the bearings of other shafts somewhat similarly situated.

K is the commutator, and $i\,i$ represent carbon brushes running in contact therewith. A side view of a holder for one of the brushes is shown at $j$ in Fig. 3. The brushes are preferably attached to a ring, of wood or other electrically non-conducting material, arranged so that it may be revolved concentrically with armature for the purpose of changing the carbon brushes, suitable contact-pieces being provided to take the current to the brushes when in proper position and an arrangement provided to lock the ring at that time.

It is to be understood that the brushes and field-coils are to be connected in the customary way to two conductors which supply the electrical energy, and that the motor is to be provided with customary details to secure its operation.

It is not essential that the cradle-shaped frame form the entire yoke. It may at times be inconvenient to obtain sufficient metal below the armature-shaft, in which case, or, in general, when it is desired to cover the top of the motor with magnetizable material, additional pieces of such material to form part of the yoke may be run over the top or sides and connect the pole-piece $A^3$ with the rear of the magnet $B^2$ or plate $A^4$ or $A^7$. A section of such an arrangement is shown in dotted lines in Fig. 4, in which it will be seen that the plate $A^7$ is extended upward by a piece V, and that a piece W is attached near the end $c$ of pole-piece $A^3$, and that the pieces V and W are connected by yoke-piece Y, bolted thereto. Any number of corresponding pieces Y may be applied, it only being necessary that the same be removable when the operations in relation to the cradle-shaped frame will be as previously described.

In Fig. 1, Z represents an arm projecting from the end $A^4$ of the cradle-shaped frame, to which attachments may be made to support that end of the motor upon springs from the car or truck in the customary way.

What I claim as my invention, and desire to secure by Letters Patent, is—

1. An electric-motor frame in the general form of a cup or cradle, capable of being made fluid-tight, with the ends raised above the center to receive pole-pieces and with the sides forming the field-yokes cut down at the armature-shaft bearings, substantially as and for the purposes specified.

2. A trough-shaped motor-frame capable of being made fluid-tight, with the ends raised above the center to receive pole-pieces and with the sides forming the field-yokes cut down at the armature-shaft bearings in combination with a removable pole-piece, brush-holding device and bearing-caps constructed, arranged and operating so that the armature with its connections may be removed at will from the top of the trough-shaped frame, substantially as and for the purposes specified.

3. A cradle-shaped electric-motor frame in combination with a removable magnet-core secured therein on an angular bearing-surface and provided with an exciting-coil, all constructed and arranged so that such core and coil may be removed from and replaced in the frame as a unit when the armature is in place, substantially as specified.

4. A cradle-shaped electric-motor frame with an end opening in combination with a removable plate closing such end and provided with a bearing-surface to connect to a magnet and pole-piece supported inside the cradle-shaped frame, substantially as and for the purposes specified.

5. In combination with the frame of an electric motor provided with pole-pieces arranged horizontally and with an opening in the bottom of the frame opposite one of the pole-pieces, a plate of non-magnetic material secured to close such opening and exclude dust and fluids, without magnetically short-circuiting the pole-pieces, substantially as and for the purposes specified.

6. In the construction of electric motors in combination with a yoke-frame inclosing one of the pole-pieces and provided with an opening opposite a horn of such pole-piece, a plate of non-magnetic material secured tightly over such opening to exclude dust and fluids and prevent magnetic leakage, substantially as and for the purposes specified.

7. In the construction of electromagnetic apparatus, in combination with an axle or shaft of magnetizable material and an adjacent magnetized part of such apparatus kept in definite relation to the axle by suitable bearings, a hook of magnetic material attached to such magnetic portion and partially inclosing the axle, to aid in neutralizing the lateral attraction between the magnetized portion and the axle and tending to reduce the load on the bearings supporting such magnetized portion, substantially as described.

8. In combination with a cradle-shaped frame provided at one end with a curved pole-piece and with sides hollowed to receive the bearings of an armature and in combination with the bearing brasses and caps of such armature-bearings, revoluble half-bushings, $f, f$, arranged and operating substantially in the manner herein described.

CHAS. E. EMERY.

Witnesses:
LIVINGSTON EMERY,
J. A. RUOFF.